United States Patent [19]

Takada et al.

[11] Patent Number: 4,823,254
[45] Date of Patent: Apr. 18, 1989

[54] DIGITAL CONTROLLER DISPLAY

[75] Inventors: Keisuke Takada; Masamichi Mizutani, both of Tokyo, Japan

[73] Assignee: Tokyo Shibaura Denki Kabushiki Kaisha, Kanagawa, Japan

[21] Appl. No.: 180,616

[22] Filed: Apr. 4, 1988

Related U.S. Application Data

[63] Continuation of Ser. No. 902,104, Aug. 29, 1986, abandoned, which is a continuation of Ser. No. 564,560, Dec. 22, 1983, abandoned.

[30] Foreign Application Priority Data

Dec. 23, 1982 [JP] Japan .................. 57-232526

[51] Int. Cl.$^4$ ............................................. G06F 15/46
[52] U.S. Cl. ..................................... 364/188; 364/146; 364/184
[58] Field of Search ............... 364/184, 186, 187, 188, 364/189, 190, 141, 144, 146; 371/8, 13

[56] References Cited

U.S. PATENT DOCUMENTS

| | | | |
|---|---|---|---|
| 4,074,354 | 2/1978 | Nakagawa et al. | 364/188 |
| 4,118,772 | 10/1978 | Takada et al. | 364/188 X |
| 4,180,860 | 12/1979 | Driscoll et al. | 364/146 |
| 4,189,765 | 2/1980 | Kotalik et al. | 364/188 |
| 4,275,439 | 10/1981 | Kuwata | 364/188 X |
| 4,404,551 | 9/1983 | Howse et al. | 364/189 X |
| 4,413,314 | 11/1983 | Slater | 364/188 |
| 4,514,798 | 4/1985 | Lesche et al. | 364/188 |
| 4,521,847 | 6/1985 | Ziehm et al. | 364/184 |
| 4,528,623 | 7/1985 | Tachibana | 364/188 X |
| 4,532,594 | 7/1985 | Hosaka et al. | 364/187 |
| 4,542,452 | 9/1985 | Fukai et al. | 364/189 X |

FOREIGN PATENT DOCUMENTS 494452 1/1978 Australia .

OTHER PUBLICATIONS

Bussman et al., "Operator/Process Communication and Monitoring with the Teleperm M System", *Siemens Power Engineering*, No. 8, 1979, pp. 257-260.
"560 Process Controller", Barber Colman Co., Advertisement-1253/DB1-1, 9/1/80.
Takada et al., "Microprocessor Based Distributed Control System with Split Architecture", 8131 Advances in Instrumentation, vol. 37, (1982) Oct., Part 2, Research Triangle Park, N.C., pp. 617-626.
Uetani, "Toshiba Programmable One-Loop Controller System, " Toshiba Review (International Edition) No. 127, Jun. 1980.

*Primary Examiner*—John R. Lastova
*Attorney, Agent, or Firm*—Finnegan, Henderson, Farabow, Garrett, & Dunner

[57] ABSTRACT

A digital controller includes a microprocessor for receiving a signal indicating a process variable from a process and calculating a manipulated variable in accordance with a predetermined algorithm in order to cause the manipulated variable signal to follow a desired setpoint variable. An operation data output system delivers an output signal to the process which holds the operation output value from the microprocessor. The controller also has on an electronic indicator for displaying the process variable, the setpoint variable, and the manipulated variable, and a driver for receiving the process variable signal and the setpoint variable to drive the electronic indicator. The driver further receives the manipulated variable from the operation data output system for driving the electronic indicator, whereby the controller is capable of displaying the manipulated variable on the electronic indicator should the microprocessor fail.

5 Claims, 6 Drawing Sheets

DIGITAL CONTROLLER DISPLAY

This application is a continuation of application Ser. No. 06/902,104, filed Aug. 29, 1986, now abandoned, which is a continuation of application Ser. No. 06/564,560, filed Dec. 22, 1983 (now abandoned).

BACKGROUND OF THE INVENTION

The present invention relates to a controller for process control and more particularly to improvements in a digital controller equipped with an electronic indicator.

DESCRIPTION OF THE PRIOR ART

Conceptually, a digital controller is an electronic control instrument which is modified to include a microprocessor for direct digital control (DDC) applications. Such a digital controller has an indicating and operating portion and a control portion with a microprocessor or microprocessors.

Some of the conventional digital controllers of this kind have a moving coil type indicator, while others have an electronic indicator. One example of a controller equipped with a moving coil type indicator is shown in FIG. 2 of U.S. Pat. No. 4,118,772. Recently there have been so-called single loop controllers which are housed in a single housing similar to a conventional analog controller as described at pages 21-27 of the Toshiba Review No. 127, May-June 1980. In this digital controller, the input terminal of the operation output indicating portion is placed at the stage following the back-up manual control means, and therefore should the microprocessor fail, it is possible to manually control the controller while watching the operation output indicating portion. However, since moving coil type indicators are inferior in performances including their resistance to vibration, readability, accuracy, etc., as compared to electronic indicators, digital controllers have recently increasingly used electronic indicators, such as light-emitting diode arrays, phosphor indicator tubes, etc.

However, an operation output indicating portion having an electronic indicator does not permit one to read the output value when the microprocessor fails and the controller is switched to back-up manual control operation. For this reason, it is customary to use only a moving coil type indicator for the operation output indicating portion, as described in U.S. Pat. No. 4,189,765. If an electronic indicator were to be used, a very expensive interface circuit would be necessary in order to read the output value after failure of the microprocessor.

FIG. 1 shows a digital controller equipped with a conventional moving coil type indicator. This controller has a multiplexer 1 for selectively accepting a signal indicating a process variable PV and other analog signals AI. The accepted signals are then converted into digital form by an analog-to-digital converter circuit 2 and supplied to a microprocessor 3, which performs PID (proportional plus integral plus derivative) operations in response to the process variable PV in accordance with a program so that the process variable PV may coincide with a desired setpoint variable value SV to find a manipulated variable value MV. The value MV is fed via an up/down counter 4 to a digital-to-analog converter circuit 5, where the digital signals are converted into analog form. This analog signal is then furnished to a final control element (not shown) to operate it. The controller further includes a moving coil type indicator portion 6, the front side of which is provided with an indicating portion 6a for indicating the process variable PV and the setpoint variable SV, a push button 6b for changing the value of the setpoint variable, switches 6c for automatic and manual control modes, an output value MV indicating portion 6d, and up/down switches 6e. Equipped on the side is a keyboard 6f having a digital display unit. An operator can increase and decrease the count in the counter 4 independently of the microprocessor 3 by operating the switches 6c and 6e. Also shown are a memory 7 such as a ROM or RAM, and a keyboard circuit 8 which stored PID parameters and the upper and lower limits of an alarm in the memory 7 or displays them on the keyboard 6f. Indicated by reference numeral 9 is a digital-to-analog converter circuit.

In the digital controller constructed as thus far described, should the microprocessor 3 fail, it is possible to increment or decrement the up/down counter 4 through the action of a switch circuit 10 by operating the control mode switches 6c and up/down switches 6e. Also, it is possible to effect a manual operation while watching the output indicating portion 6d. However, since moving coil type indicators are inferior in performances to electronic indicators as noted before, digital controllers have recently increasingly adopted electronic indicators. But when only an electric indicator is used for the control output indicating portion without changing other portions, it is not possible to read the manipulated variable when the microprocessor fails, even if the controller is switched to manual control operation.

SUMMARY OF THE INVENTION

It is an object of the present invention to provide a digital controller which is equipped with an electronic indicator and contributes to safe operation of a process.

It is another object of the invention to provide a digital controller which effectively uses an electronic indicator.

It is a further object of the invention to provide a digital controller which is equipped with an electronic indicator and is capable of retaining the display function for its manipulated variable display portion even if its microprocessor fails.

It is an additional object of the invention to provide a digital controller which can display the value of the manipulated variable even when the controller is switched to manual operation if its microprocessor fails.

The present invention is embodied in a digital controller which comprises a microprocessor for receiving a process variable signal and a desired setpoint variable and performing predetermined arithmetic operations to find a manipulated variable value, an electronic indicator, a portion for driving the indicator and storing the process variable and the setpoint variable supplied from the micrprocessor, a holding means manually controllable and holding the manipulated variable, and means for converting the manipulated variable from the holding means into pulse form for displaying the resultant pulse signals on the electronic indicator as data for displaying the operation output.

PREFERRED EMBODIMENTS OF THE INVENTION

Figure 1:
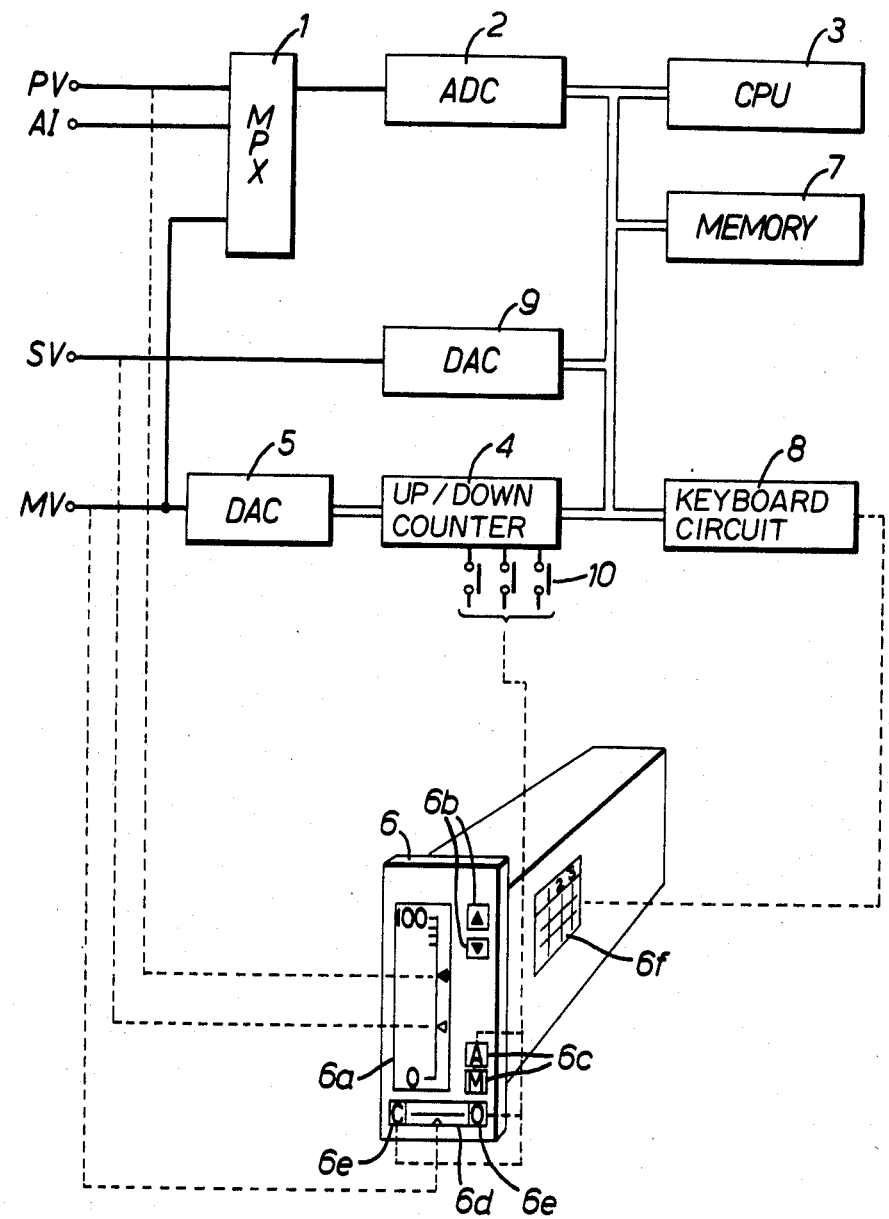
FIG. 1 is a block diagram of a digital controller equipped with a conventional moving coil type indicator.
Figure 2:
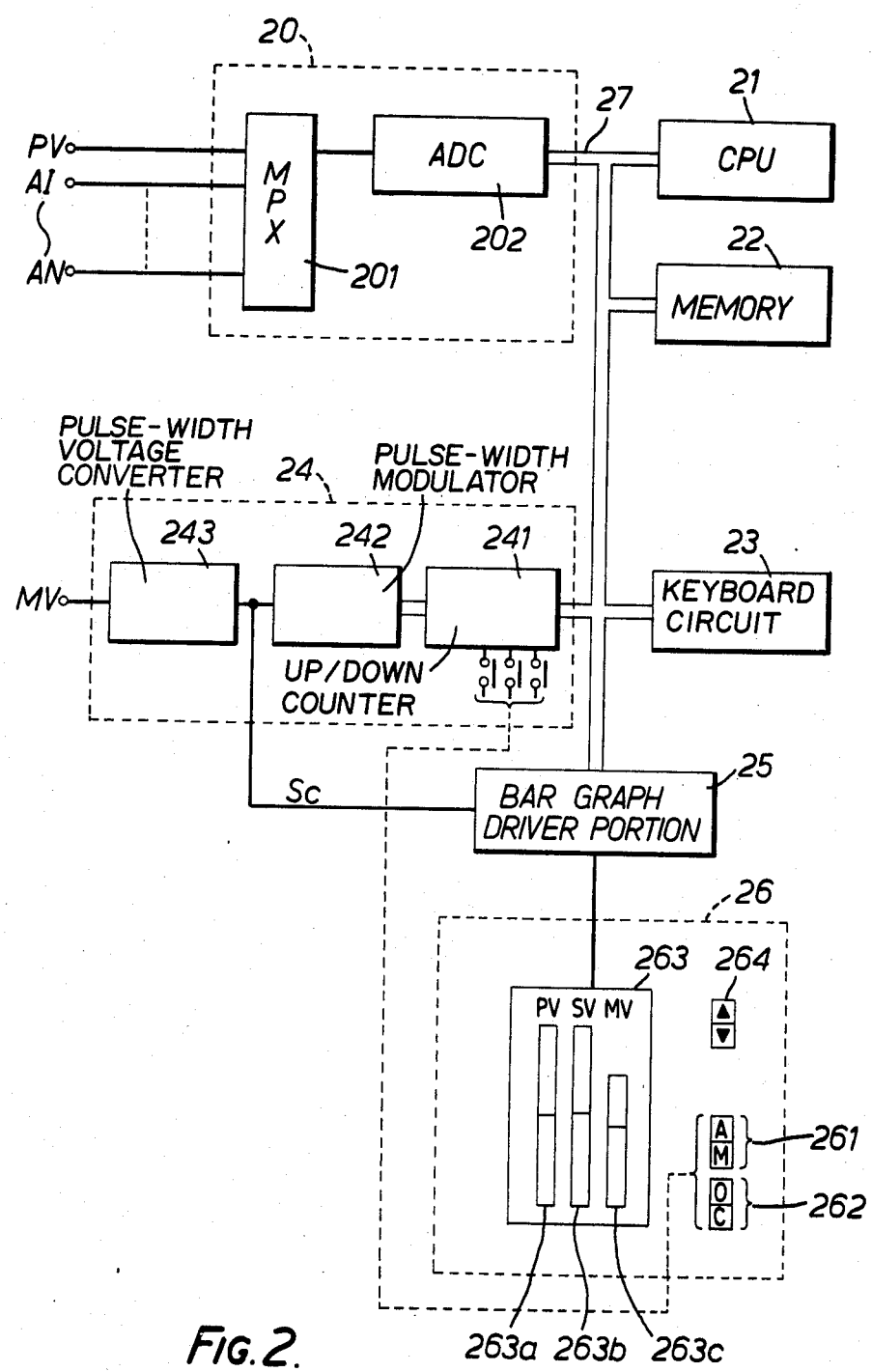
FIG. 2 is a block diagram of a digital controller according to the present invention.

Referring now to FIG. 2, there is shown a digital controller equipped with an electronic indicator embodying the concept of the present invention. In this illustrative example, the indicator makes use of bar graph representation. This controller includes a data input system 20 for receiving a signal indicating a process variable PV and other analog signals AI–AN, a microprocessor 21, a memory 22, a keyboard circuit 23, an operation data output system 24, a bar graph driver portion 25, and the electronic indicator 26. These components are connected together by means of a bus 27. The data input system 20 has a multiplexer 201 for selectively accepting the signal indicating the process variable PV and other necessary analog signal AI–AN in accordance with the instructions of the microprocessor 21, and an analog-to-digital converter circuit 202 for converting the signals accepted by the multiplexer 201 into digital form and feeding the digitized signals to the microprocessor 21. The microprocessor 21 fetches a desired setpoint variable SV from the memory 22 and performs proportional integral derivative (PID) calculations, for example, to find a manipulated variable value such that the process variable PV applied from the A/D converter 202 coincides with the setpoint variable value SV. The manipulated variable value is then delivered to the operation data output system 24.

The memory 22 includes a ROM for storing predetermined values such as the setpoint variable value SV and parameters necessary for arithmetic operations in the microprocessor 21, and a RAM for writing renewal data threin successively. The keyboard circuit 23 acts to write the PID parameters for arithmetic operations, the upper and lower limits of an alarm, etc. in the memory 22 and to display these values on a digital display unit (not shown).

The operation data output system 24 has an up/down counter 241 in which the MV obtained by the microprocessor 21 is stored in advance, a pulse-duration modulation circuit 242 for producing signals Sc, whose pulse duration is modulated within a fixed period according to the output value from the counter 241, and a pulse duration-to-voltage converter circuit 243 for converting the modulated signals Sc into an analog voltage signal. The output signal from the converter circuit 243 is used to control a final control element (not shown). An operator can manually operate automatic/manual control mode switches 261 and up/down switches 262 to increment or decrement the counter 241 independent of the microprocessor 21.

The bar graph driver portion 25 receives the modulated signals Sc from the modulation circuit 242, fetches the data relating to the process variable value and setpoint variable value from the micrprocessor, and delivers the data to the electronic indicator 26. The indicator 26 has a bar graph display portion 263 which includes bar graphs 263a, 263b, 263c for the process variable, the desired setpoint variable value and a manipulated variable, respectively. The indicator 26 further includes a push button 264 for changing the setpoint variable value, automatic/manual control mode switches 261, and up/down switches 262.

Figure 3:
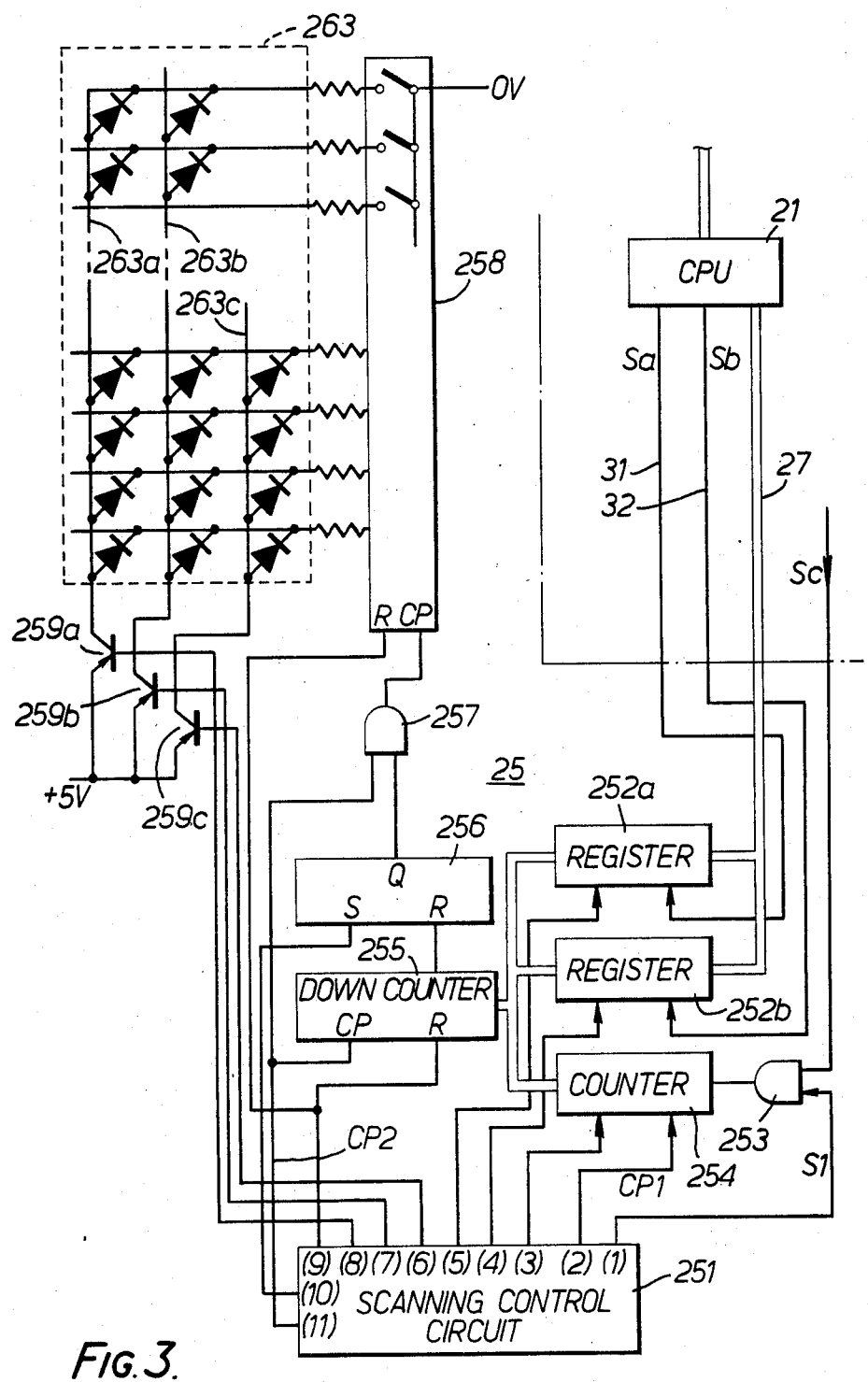
FIG. 3 is a view specifically showing the construction of the bar graph driver portion and the bar graph display portion of the digital controller shown in FIG. 2.

The construction of the bar graph driver portion 25 and the bar graph display portion 263 are specifically shown in FIG. 3. The driver portion 25 includes a scanning control circuit 251, a process variable register 252a, a setpoint variable register 252b, an AND gate 253, and an operation output value counter 254. The register 252a stores the data regarding the process variable and the setpoint variable on the bus 27 in response to select signals Sa and Sb which are fed from the microprocessor 21 through control lines 31 and 32 respectively. The AND gate 253 produces an output signal which is the AND of the pulse modulated signals Sc and the signal S1 from the control circuit 251 (signal (1) in FIG. 5) which have the same period as the fixed period of the modulation circuit 242. The counter 254 counts the clock pulses CP1 which are delivered from the control circuit 251 (signal (2) in FIG. 5) in response to the output signal from the AND gate 253.

Figure 5:
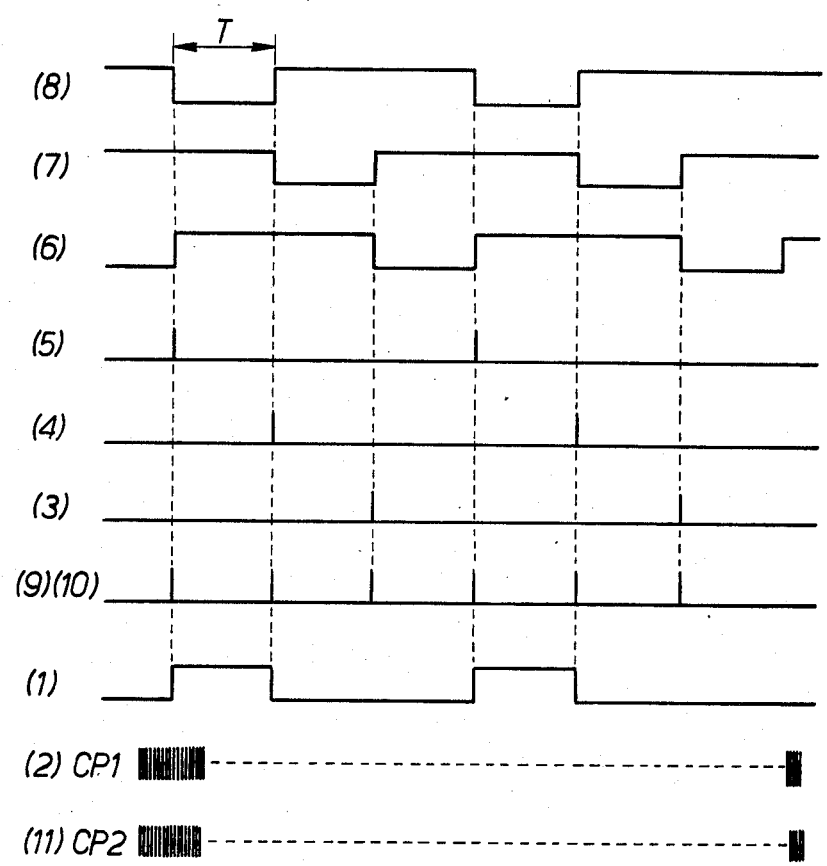
FIG. 5 is a timing chart for the scanning control circuit of FIG. 4.

A down counter 255 previously stores the data from the register which is selected by the control circuit 251, and the counter decrements its preset value in response to clock signal CP2 from the circuit 251 (signals (11) respectively in FIG. 5). A flip-flop 256 is set by a set signal from the control circuit 251 (signal (10) in FIG. 5) and reset when the count in the counter 255 decreases down to zero. An AND gate 257 delivers output signals in succession in response to the clock signal CP2 from the control circuit 251 when it is supplied with a signal from the flip-flop 256. A shift register 258 whose contents are successively shifted in response to the signals from the AND gate 257 gives selective drive signals to the horizontal bars of the bar graph display portion 263. Selective drive circuits 259a–259c furnish selective drive signals to the vertical bars of the display portion 263 in response to the selective signals from the control circuit 251. The display portion 263 has a plurality of vertical bars and a plurality of horizontal bars arranged in a matrix form. Light-emitting diodes are connected to the intersections of the bars.

In the operation of the digital controller constructed as described just above, the multiplexer 201 samples the signal indicating the value PV obtained by a process measurement, for example, and other analog signals AI–AN in succession in accordance with the instructions from the microprocessor 21. The sampled data are supplied to the following A/D converter circuit 202, which converts the analog signal from the multiplexer 201 into digital form and then provides the resultant digital signals to the microprocessor 21. Then, the microprocessor 21 reads the setpoint variable value SV from the memory 22 and performs PID operations so that the process variable PV supplied from the A/D converter circuit 202 will coincide with the setpoint variable value SV to find the manipulated variable value MV. The microprocessor 21 then serves to write the process variable PV and manipulated variable MV into the memory 22 and to supply a select signal to the registers 252a, 252b of the bar graph drive portion 25 through the control lines 31, 32 for writing the process variable PV and setpoint variable SV into the register 252a and 252b, respectively. The manipulated variable value MV obtained by the operation is loaded into the up/down counter 241 of the output system 24 in advance, and the total count of the counter is fed to the pulse-duration modulation circuit 242, which produces signals Sc whose pulse duration is modulated within a fixed period T according to the output value from the counter 241. The modulated signals are then furnished to the AND gate 253 and the pulse duration-to-voltage converter circuit 243. The converter circuit 243 converts its input signal into an analog voltage corresponding to the pulse duration and then supplies it to the final control element for control purposes.

Figure 4:
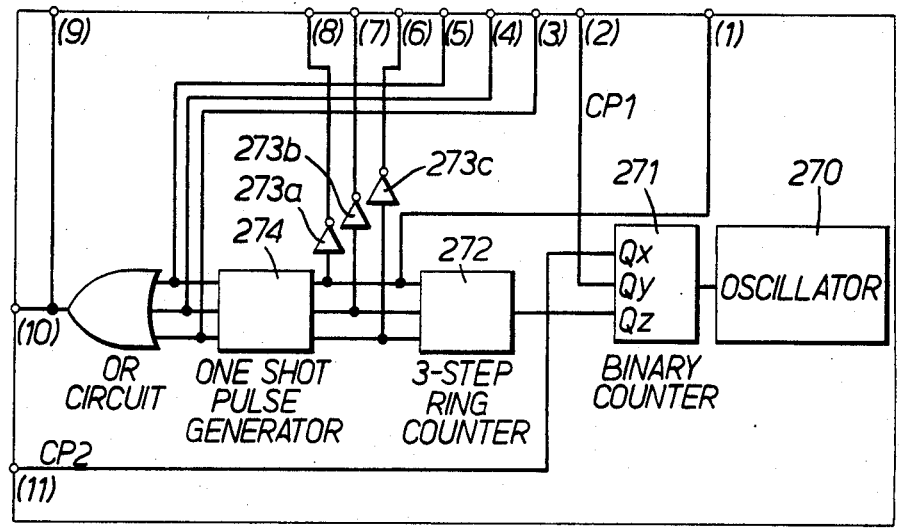
FIG. 4 is a block diagram of the scanning control circuit.

Referring now to FIG. 4 there is shown a block diagram of the scanning control circuit 251. A conventional oscillator 270 generates pulse signals which are applied to binary counter 271. The counter 271 has three output signals from its output terminals Qx, Qy, and Qz. A clock signal CP2 is generated at terminal Qx and applied to output terminal (11) of circuit 251. A second clock signal CP1 is generated at terminal Qy and applied to output terminal (2) of circuit 251. The frequency of the signal at terminal Qx is higher than the frequency of the signal at terminal Qy. The frequency of the signal at the terminal Qy is higher than that at the terminal Qz. The signal from terminal Qz is applied to a three step ring counter 272.

The ring counter 272 outputs three sequential pulse signals of the same period and frequency but displaced in time. The selective drive circuits 259a–259c are operated by the signals (6), (7) and (8) which receive the inverted output signals of the three step ring counter 272. The signals are inverted by inverters 273a, b and c. A one shot pulse generator 274, receives the output signals from ring counter 272 and outputs "1" level one shot pulse signals applied to output terminals (3), (4) and (5) when its input signal goes from a "zero" level to a "1" level.

FIG. 5 shows a timing chart for the respective output signals of the scanning control circuit 251 described above.

Figure 6:
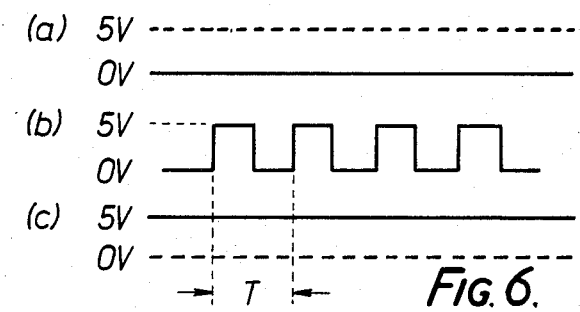
FIGS. 6a–6c are diagrams for illustrating the operation of the pulse-duration modulation circuit of the digital controller shown in FIG. 2.

Referring to FIG. 6, the output signals from the pulse-duration modulation circuit 242 are shown. The conditions in which the output level is 0%, 50% and 100% of its maximum level are shown in (a), (b) and (c), respectively. When it is 50%, the ratio of the durations in which 5-V condition (logic high level) and 0-V condition (logic low level) are maintained, respectively, are 1:1 (50%:50%) for the fixed period T.

Figure 7:
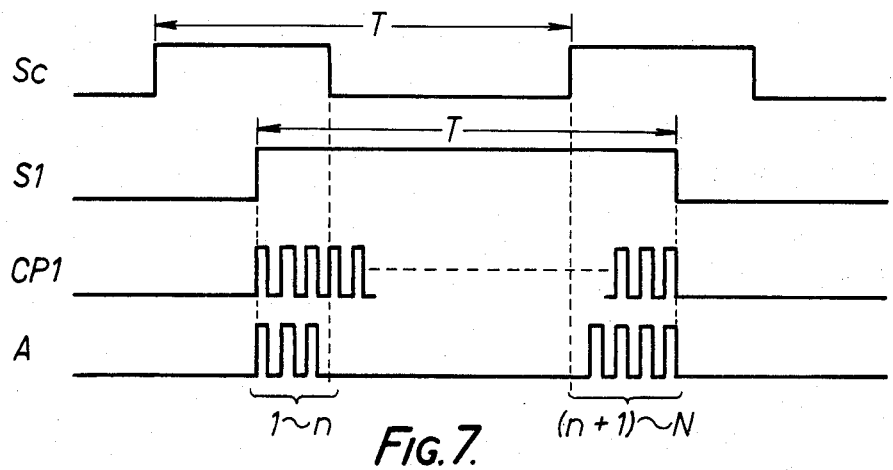
FIG. 7, is a diagram for illustrating the operation of the bar graph driver portion of the digital controller shown in FIG. 2.

The modulated signals Sc obtained in this way are fed to the AND gate 253, the other input terminal of which is supplied with a select signal $S_1$ having the same period T as the modulation circuit 242 as shown in FIG. 7 via the output (1) of the scanning control circuit 251. At the same time, the control circuit 251 delivers clock signal CP1 whose period is T/100, for example. Thus, the counter 254 counts upward the clocks CP1 only when the high "1" level of the modulated signals Sc and the select signals $S_1$ satisfy an AND condition, and it produces the manipulated variable value MV. In FIG. 7 the A curve shows the manner in which the counter 254 counts the clocks upward and the count in the counter.

Specifically, the counter 254 reaches the count of n when the signals Sc and $S_1$ are initially ANDed, and it goes up to the count of n+1 when both are next ANDed. It is to be noted that FIGS. 3 and 7 show the case where the modulated signals Sc and the select signals $S_1$ are asynchronous. However, it is also possible to synchronize these signals with each other.

After the process variable PV, the setpoint variable SV, and the manipulated variable MV are loaded into the registers 252a, 252b, and the counter 254, respectively, the control circuit 251 selects the combination of the register 252a and the selective drive circuit 259a, the combination of register 252b and the selective drive circuit 259b, and the combination of register 254 and the selective drive circuit 259c, in a time sharing manner using the select signal. As an example, when the register 252a for the process variable is selected, the contents are loaded in the down counter 255. Thereafter, the clock signal CP2 delivered by control circuit 251 is fed to the counter 255 and the AND gate 257. The counter 255 is decremented for every clock CP2, and when it goes down to zero the counter 255 resets the flip-flop 256. Meanwhile, the AND gate 257 delivers output signals to the shift register 258 successively in response to the incoming clock signal CP2 until it is reset by the counter 255. The shift register 258 produces a select drive signal to the horizontal bars of the display portion 253 each time it receives a signal from the AND gate 257. As a result, the light-emitting diodes of the measured value bar graph 263a whose number corresponds to the process variable PV light up. Similar operations are performed on the setpoint variable SV and the manipulated variable MV to display them on the display portion 263.

In the foregoing description, it is assumed that the output signal from the modulation circuit 242 takes the form shown in FIG. 6. However, when the modulation circuit 242 produces output signals proportional to the count of 0 to 1000, for example, of the counter 254 and the manipulated variable MV is converted into a voltage of 0–5 V by the converter circuit 243, 1–5 V of the manipulated variable MV provides an indication of 0 to 100% in instrumentation control applications where a digital controller is usually employed. However if the counter 254 counts the signals Sc shown in FIG. 7 as it is, a surplus count corresponding to 1V is added. For this reason, it is customary to reduce the voltage by 1V when the counter 254 effects a counting operation. This is realized by inserting appropriate logic betwen the counter 254 and the down counter 255, into which data are loaded from the counter 254, to reduce the voltage by 1V.

Figure 8:
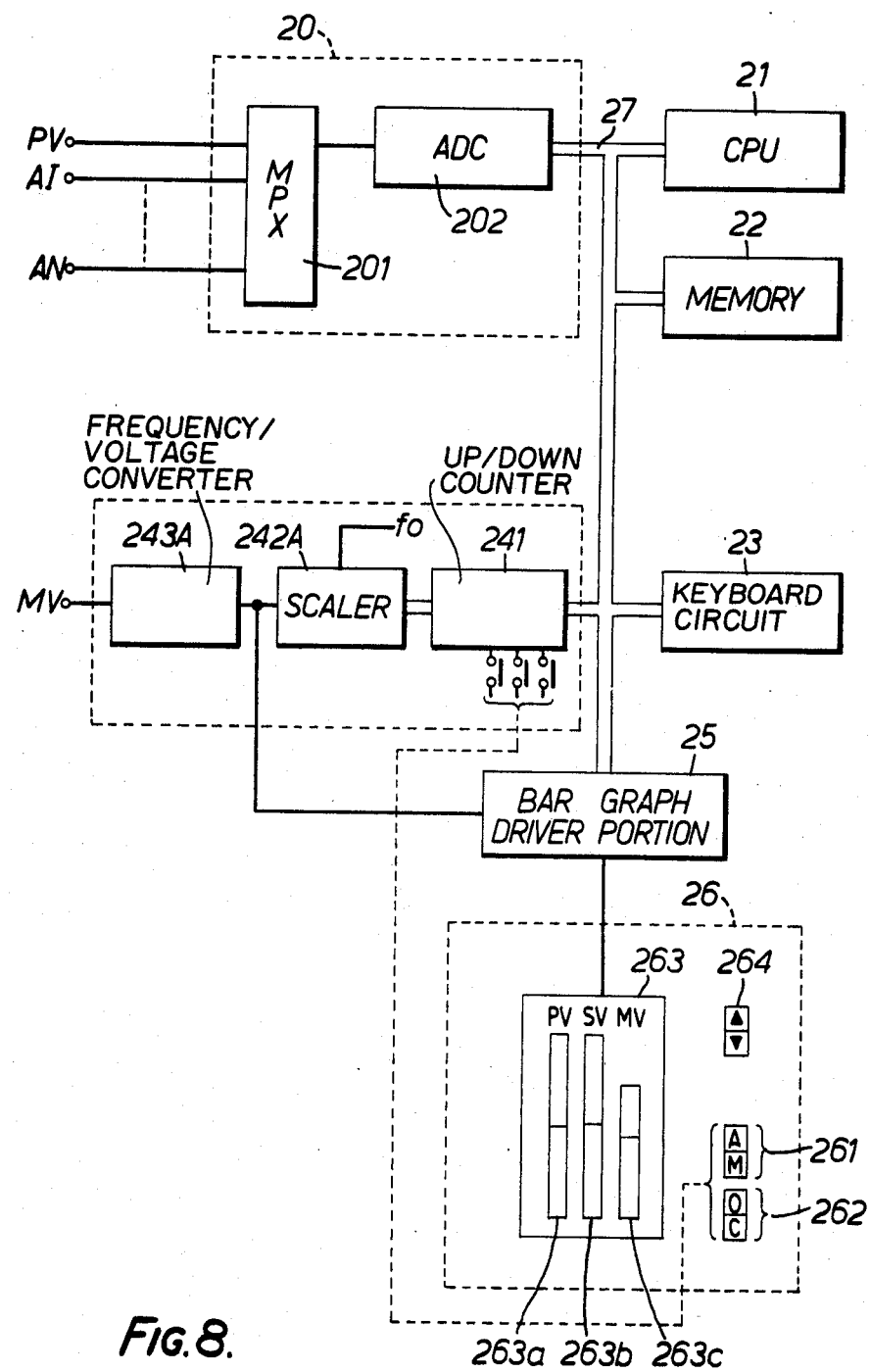
FIG. 8 is a block diagram of another digital controller according to the invention.

It is to be understood that the present invention is not limited to the foregoing embodiment. For example, the pulse-duration modulation circuit 242 and the pulse duration-to-voltage converter circuit 243 placed on the output side of the up/down counter 241 as shown in FIG. 3 may be replaced with equal utility by a pulse frequency scaler 242A, which produces a frequency of 0 to $f_0$ in response to variations in the operation output from 0 to 100%, and a frequency-to-voltage converter circuit 243A for converting the output frequency from the scaler 242A into an analog voltage as shown in FIG. 8. And when the display portion has two bar graphs, the process variable PV and the set point variable SV may be displayed on one bar graph and the manipulated variable MV on the other.

In this way, since the operation output value obtained by arithmetic operations in the microprocessor is written into the register and then displayed, it is possible to display the value even if the micrprocessor fails. Further, it is possible to increase and decrease it manually, so process control can be operated manually also. Additionally, since the output from the up/down counter in which the manipulated variable is loaded is converted into the corresponding pulses, only addition of simple circuits to a conventional bar graph driver portion is necessary. Thus, a digital controller is provided, in which the hardware structure is simple and isolation systems have been easily performed.

What is claimed is:

1. A digital controller comprising:
   means for receiving analog signals indicating process variables of a process;
   means for converting said signals to digital form;
   a microprocessor for calculating a manipulated variable by arithmetic operations in accordance with a predetermined algorithm to cause the process variable signal to follow a setpoint variable;
   an operation data output system for delivering an output for controlling the process, said system having means for holding the manipulated variable received from the microprocessor and manually operable if said microprocessor fails;
   bar graph display type electronic indicating means for displaying the process variable, the setpoint variable, and the manipulated variable; and
   driver means including
   control circuit means for outputting control signals and clock signals to control the timing of operation of said driver means,
   two registers for receiving the process variable and the setpoint variable from the microprocessor, said two registers selectively outputting the process variable and the setpoint variable in response to signals from the microprocessor,
   counter means for counting said clock signals output from said control circuit means, and selective drive means for furnishing selective drive signals to said bar graph display type electronic means in response to said control signals from said control circuit means said driver means further acting to receive the manipulated variable from the holding means of the operation data output system for driving the electronic indicating means.

2. A digital controller as set forth in claim 1, wherein the electronic indicating means comprises bar graph display devices which are driven by said driver means.

3. A digital controller for controlling a process comprising:
   a microprocessor for receiving a signal indicating a process variable and calculating a manipulated variable by arithmetic operations to cause the process variable signal to follow a setpoint variable;
   a first and second register for storing the process variable signal and the setpoint variable, respectively, generated from the microprocessor;
   a first counter which can be loaded with the manipulated variable signal derived by the microprocessor and can be manually controlled;
   pulse-duration modulation means for converting the output of said first counter into pulses of a given frequency the pulse duty factor of which corresponds to the contents of the first counter;
   converter means for converting the pulses delivered from the modulation means into an analog manipulated variable signal for controlling the processes;
   a scanning control circuit for performing timing control;
   a second counter for counting the manipulated variable corresponding to pulses obtained by the pulse-duration modulated means; and
   drive and display means for selectively reading the contents of the first and second registers and of the second counter by scanning of the scanning control circuit for energizing bar graph indicators to indicate the process variable, the setpoint variable and the manipulated variable.

4. A digital controller as set forth in claim 3, wherein the pulse duration-modulated signals obtained by the pulse duration modulation means are counted responsive to clock signal from said scanning control circuit to find the manipulated variable.

5. A digital controller comprising:
   a microprocessor for receiving a signal indicating a process variable and calculating a manipulated variable by arithmetic operations to cause the process variable signal to follow a setpoint variable;
   a first and a second register for respectively storing the process variable signal and the setpoint variable generated from the microprocessor;
   a first counter which is loaded with the manipulated variable signal derived by the microprocessor and is manually controlled;
   first converter means for converting the output of said first counter input pulses whose frequency corresponds to the contents of the first counter;
   second converter means for converting the pulses delivered from the first converter means into an analog manipulated variable signal for controlling the process;
   a scanning control circuit for performing timing control;
   a second counter for counting the manipulated variable, the counter acting to count the pulses obtained from the first converter means responsive to the scanning control circuit; and
   drive and display means for selectively reading the contents of the first and second registers and of the second counter by scanning of the scanning control circuit for energizing bar graph indicators to indicate the process variable, the setpoint variable, and the manipulated variables.

* * * * *